(12) United States Patent
Hamada (10) Patent No.: US 11,842,852 B2
(45) Date of Patent: Dec. 12, 2023

(54) MULTILAYER CERAMIC CAPACITOR (71) Applicant: Murata Manufacturing Co., Ltd., Nagaokakyo (JP)

(72) Inventor: Daisuke Hamada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 24 days.

(21) Appl. No.: 17/693,712

(22) Filed: Mar. 14, 2022

(65) Prior Publication Data
US 2022/0301773 A1   Sep. 22, 2022

(30) Foreign Application Priority Data

Mar. 17, 2021   (JP) ................. 2021-043886

(51) Int. Cl.
*H01G 4/12* (2006.01)
*H01G 4/012* (2006.01)
*H01G 4/30* (2006.01)
*H01G 4/008* (2006.01)

(52) U.S. Cl.
CPC ........... *H01G 4/1227* (2013.01); *H01G 4/008* (2013.01); *H01G 4/012* (2013.01); *H01G 4/30* (2013.01)

(58) Field of Classification Search
CPC ...... H01G 4/1227; H01G 4/008; H01G 4/012; H01G 4/30
See application file for complete search history.

(56) References Cited

U.S. PATENT DOCUMENTS

| 6,245,433 | B1 | 6/2001 | Nakamura et al. |
| 7,161,795 | B1* | 1/2007 | Megherhi ............. C04B 35/468 |
| | | | 156/89.12 |
| 2002/0039667 | A1* | 4/2002 | Takaya ..................... H01Q 1/38 |
| | | | 428/323 |

(Continued)

FOREIGN PATENT DOCUMENTS

| CN | 106977194 A | 7/2017 |
| CN | 111724992 A | 9/2020 |

(Continued)

OTHER PUBLICATIONS

First Office Action in CN202210213886.2, dated Aug. 11, 2023, 7 pages.
Office Action in JP2021-043886, dated Oct. 10, 2023, 2 pages.

*Primary Examiner* — Michael P McFadden
(74) *Attorney, Agent, or Firm* — Keating & Bennett, LLP (57) ABSTRACT

A multilayer ceramic capacitor includes first and second main surfaces opposite to each other in a thickness direction, first and second side surfaces opposite to each other in a width direction, first and second end surfaces opposite to each other in a longitudinal direction, an element body including dielectric layers and internal electrode layers stacked in the thickness direction, and a pair of external electrodes on the first and second end surfaces and electrically connected to the internal electrode layers, in which the dielectric layers include, as a main component, a perovskite oxide including barium and titanium, and the dielectric layers include an inner portion that is in contact with the internal electrode layer and includes an interface layer including a non-perovskite oxide including tin, barium, and titanium.

20 Claims, 6 Drawing Sheets

(56) References Cited

U.S. PATENT DOCUMENTS

| | | | |
|---|---|---|---|
| 2009/0207551 A1* | 8/2009 | Suzuki | C04B 35/49 |
| | | | 501/137 |
| 2013/0321980 A1* | 12/2013 | Suzuki | H01G 4/30 |
| | | | 29/25.42 |
| 2017/0178808 A1 | 6/2017 | Shimada et al. | |
| 2020/0035416 A1* | 1/2020 | Kwon | H01G 4/1227 |
| 2020/0303125 A1 | 9/2020 | Tsuru et al. | |
| 2021/0098191 A1* | 4/2021 | Saito | H01G 4/1227 |
| 2021/0155549 A1* | 5/2021 | Nomura | H01G 4/008 |
| 2022/0093339 A1* | 3/2022 | Noh | H01G 4/012 |

FOREIGN PATENT DOCUMENTS

| | | |
|---|---|---|
| JP | 3334607 B2 | 10/2002 |
| JP | 2017109904 A | 6/2017 |
| WO | 2012111592 A1 | 8/2012 |

\* cited by examiner

MULTILAYER CERAMIC CAPACITOR

CROSS REFERENCE TO RELATED APPLICATIONS

The present application is based on and claims priority to Japanese Patent Application No. 2021-043886, filed on Mar. 17, 2021, the entire contents of which are incorporated herein by reference.

BACKGROUND OF THE INVENTION

1. Field of the Invention

The present invention relates to a multilayer ceramic capacitor.

2. Description of the Related Art

The demand for multilayer ceramic capacitors (MLCCs) has been increasing with decreasing size of electronic devices, such as cellular phones, and increasing CPU speed. The multilayer ceramic capacitor has a structure including dielectric layers and internal electrode layers stacked alternately and has a relatively large capacitance due to its high-permittivity dielectric thin layers even with a small size. Among known multilayer ceramic capacitors produced using a variety of materials, those having dielectric layers made of a barium titanate ($BaTiO_3$)-based compound and having internal electrode layers made of a base metal, such as nickel (Ni), are in wide use because of their low price and high performance.

A reduction in the thickness of dielectric layers is important for making compact, high-capacitance multilayer ceramic capacitors. Unfortunately, a reduction in the thickness of dielectric layers may raise a problem in that the insulation resistance between internal electrode layers may decrease, which may lead to degradation of reliability. To address such a problem, a technique for improving insulation resistance and reliability is proposed which includes adding an additive, such as a rare earth element (RE) or magnesium (Mg), to dielectric layers including a $BaTiO_3$-based compound.

For example, disclosed is a dielectric ceramic composition including a main component represented by a specific composition formula and including barium zirconate, magnesium oxide, manganese oxide, and at least one selected from barium titanate, europium oxide, gadolinium oxide, terbium oxide, dysprosium oxide, holmium oxide, erbium oxide, thulium oxide, and ytterbium oxide (see claim 1 in Japanese Patent No. 3334607). Japanese Patent No. 3334607 discloses using such a ceramic composition for forming dielectric ceramic layers of multilayer ceramic capacitors having internal electrodes including nickel or a nickel alloy. Japanese Patent No. 3334607 also discloses that when used in a high-intensity electric field, such capacitors can have a high product (CR product) of insulation resistance and capacitance, a high dielectric strength, and high weatherability, such as high temperature resistance or high humidity resistance (see claim 4 and paragraph [0007] in Japanese Patent No. 3334607).

SUMMARY OF THE INVENTION

A further reduction in size and a further increase in capacitance have been expected for multilayer ceramic capacitors as electronic components and devices have advanced. As multilayer ceramic capacitors have found wider applications, there has been an increasing demand for improvement in their reliability. Thus, a need exists for multilayer ceramic capacitors that have high insulating characteristics and high reliability with less degradation at high temperature and high humidity even with reduced layer thickness. The technique proposed in the conventional art is effective to a certain extent, but still has room for improvement.

In light of the problems mentioned above, the inventors have conducted intensive studies. As a result, the inventors have discovered that a multilayer ceramic capacitor including internal electrode layers and dielectric layers including, as a main component, a perovskite oxide including barium (Ba) and titanium (Ti) can have improved reliability when a specific interface layer is provided and includes an inner portion of the dielectric layer and is in contact with the internal electrode layer.

Preferred embodiments of the present invention provide multilayer ceramic capacitors each having high reliability.

Preferred embodiments of the present invention encompasses the aspects shown below. As used herein, the expression "X to Y" refers to a range including the lower and upper limit values X and Y. In other words, the expression "X to Y" is interchangeable with "X or more and Y or less".

According to an aspect of a preferred embodiment of the present invention, a multilayer ceramic capacitor includes first and second main surfaces opposite to each other in a thickness direction, first and second side surfaces opposite to each other in a width direction, and first and second end surfaces opposite to each other in a longitudinal direction, an element body including multiple dielectric layers and multiple internal electrode layers stacked in the thickness direction, and a pair of external electrodes provided on the first and second end surfaces and electrically connected to the multiple internal electrode layers, the dielectric layers including, as a main component, a perovskite oxide including barium (Ba) and titanium (Ti), the dielectric layers including an inner portion that is in contact with the internal electrode layer and includes an interface layer including a non-perovskite oxide including tin (Sn), barium (Ba), and titanium (Ti).

According to preferred embodiments of the present invention, multilayer ceramic capacitors each achieve high reliability.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Specific preferred embodiments of the present invention (hereinafter, referred to as the "preferred embodiments") will be described. It will be understood that the preferred embodiments described below are not intended to limit the present invention and may be altered or modified in various ways without departing from the gist of the present invention.

(1) Multilayer Ceramic Capacitor

A multilayer ceramic capacitor according to a preferred embodiment of the present invention includes first and second main surfaces opposite to each other in a thickness direction, first and second side surfaces opposite to each other in a width direction, first and second end surfaces opposite to each other in a longitudinal direction, an element body including multiple dielectric layers and multiple internal electrode layers stacked in the thickness direction, and a pair of external electrodes provided on the first and second end surfaces and electrically connected to the multiple internal electrode layers. The dielectric layers include, as a main component, a perovskite oxide including barium (Ba) and titanium (Ti). The dielectric layers include an inner portion that is in contact with the internal electrode layer and includes a non-perovskite interface layer including tin (Sn), barium (Ba), titanium (Ti), and oxygen (O).

Figure 1:
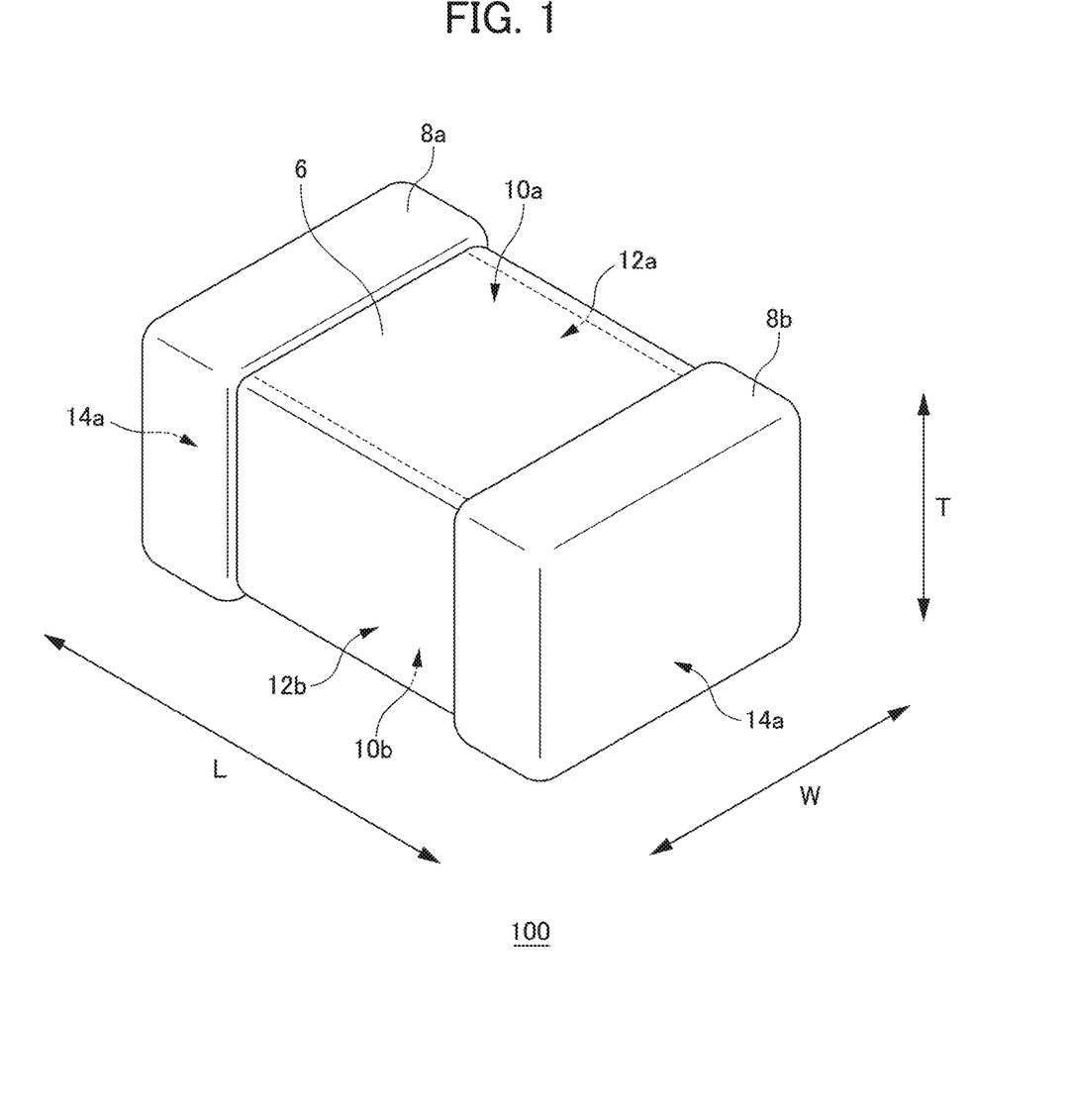
FIG. 1 is a perspective view showing an outer shape of a multilayer ceramic capacitor.
Figure 2:
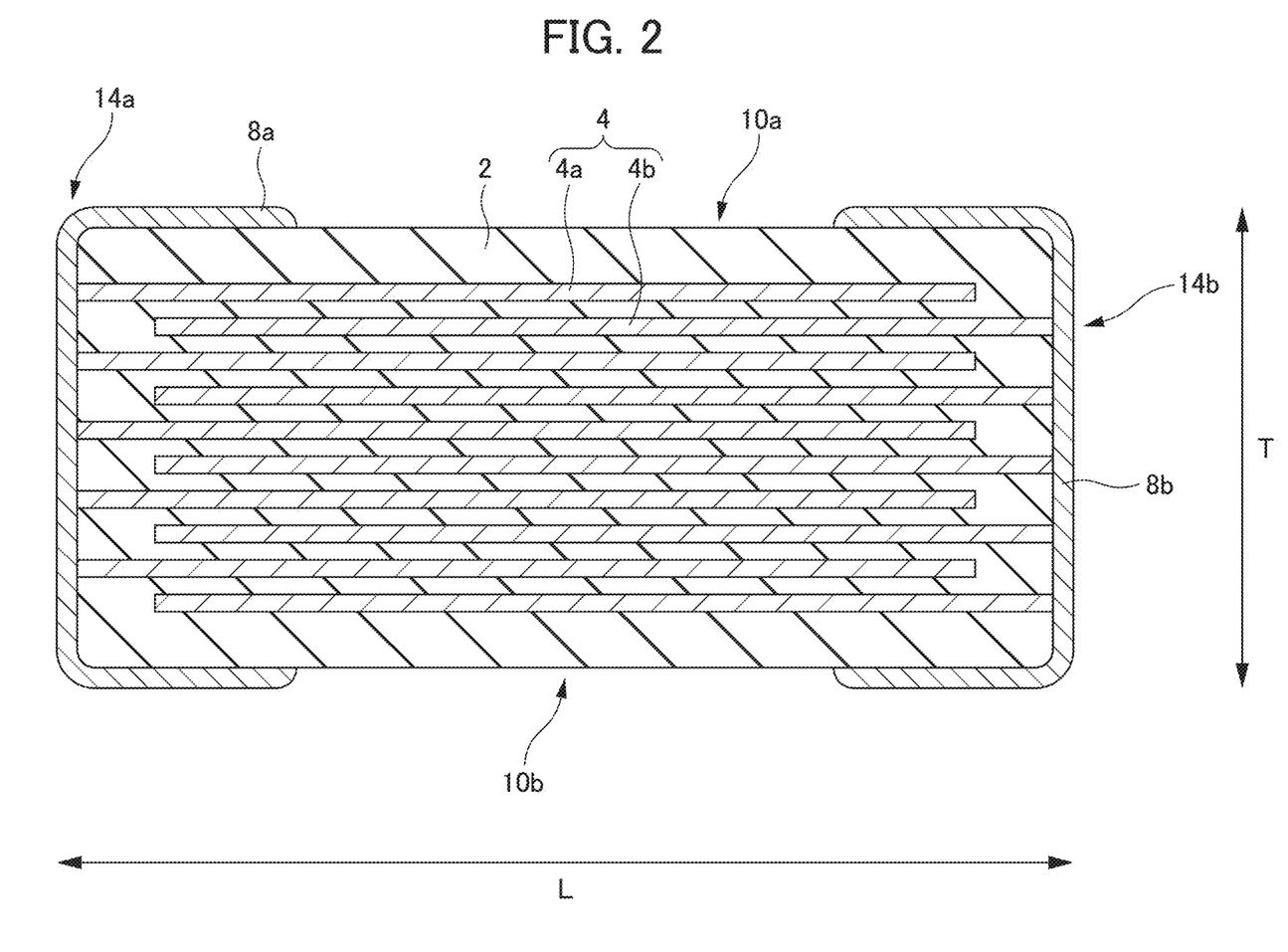
FIG. 2 is a cross-sectional view schematically showing an inner structure of a multilayer ceramic capacitor.
Figure 3:
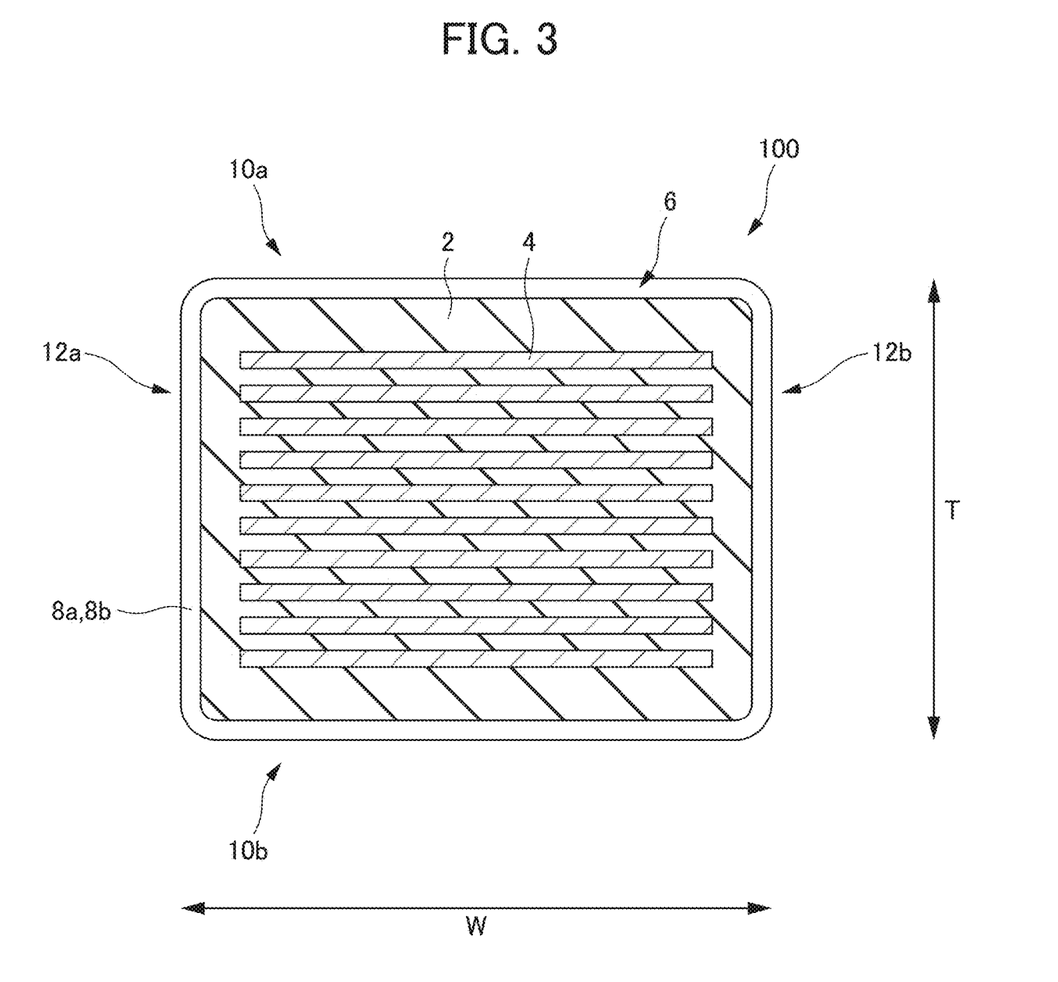
FIG. 3 is a cross-sectional view schematically showing an inner structure of a multilayer ceramic capacitor.

A preferred embodiment of a multilayer ceramic capacitor will be described with reference to FIGS. 1 to 3. FIG. 1 is a perspective view showing the outer shape of the multilayer ceramic capacitor. FIGS. 2 and 3 are cross-sectional views showing the inside of the multilayer ceramic capacitor. The multilayer ceramic capacitor 100 includes an element body 6 including multiple dielectric layers 2 and multiple internal electrode layers 4, which are stacked on each other, and a pair of external electrodes 8a and 8b provided on the two end surfaces 14a and 14b of the element body 6. The multilayer ceramic capacitor 100 and the element body have a substantially rectangular parallelepiped shape. The expression "substantially rectangular parallelepiped" includes not only rectangular parallelepiped but also modified rectangular parallelepiped with a rounded corner or corners and/or a rounded ridge or ridges. The multilayer ceramic capacitor 100 and the element body 6 include a first main surface 10a and a second main surface 10b, which are opposite to each other in the thickness direction T, a first side surface 12a and a second side surface 12b, which are opposite to each other in the width direction W, and a first end surface 14a and a second end surface 14b, which are opposite to each other in the longitudinal direction L. As used herein, the term "thickness direction T" refers to the direction in which the dielectric layers 2 and the internal electrode layers 4 are stacked. The term "longitudinal direction L" refers to the direction perpendicular to the thickness direction T and perpendicular to the end surfaces 14a and 14b on which the external electrodes 8a and 8b are provided. The width direction W is perpendicular to the thickness direction T and the longitudinal direction L. The plane including the thickness direction T and the width direction W is called the WT plane. The plane including the width direction W and the longitudinal direction L is called the LW plane. The plane including the longitudinal direction L and the thickness direction T is called the LT plane.

The external electrodes include a first external electrode 8a provided on the first end surface 14a and a second external electrode 8b provided on the second end surface 14b. The first external electrode 8a lies on the first end surface 14a and may extend over a portion of each of the first and second main surfaces 10a and 10b and the first and second side surfaces 12a and 12b. The second external electrode 8b lies on the second end surface 14b and may extend over a portion of each of the first and second main surfaces 10a and 10b and the first and second side surfaces 12a and 12b. However, the first and second external electrodes 8a and 8b are not in contact with each other and are electrically separated from each other.

The internal electrode layers 4 include multiple first internal electrode layers 4a and multiple second internal electrode layers 4b. The first internal electrode layers 4a extend to the first end surface 14a and are electrically connected to the first external electrode 8a at the first end surface 14a. The second internal electrode layers 4b extend to the second end surface 14b and are electrically connected to the second external electrode 8b at the second end surface 14b. The first and second internal electrode layers 4a and 4b are opposed to each other with the dielectric layer 2 in between them and are electrically separated from each other. Thus, a charge is stored between the first and second internal electrode layers 4a and 4b when a voltage is applied across the first and second internal electrode layers 4a and 4b via the external electrodes 8a and 8b. The stored charge produces a capacitance to allow the capacitor to function.

The multilayer ceramic capacitor 100 may have any dimensions. Preferably, the multilayer ceramic capacitor 100 has a size of about 0.2 mm or more and about 1.2 mm or less in the longitudinal direction L, a size of about 0.1 mm or more and about 0.7 mm or less in the width direction W, and a size of about 0.1 mm or more and about 0.7 mm or less in the stacking direction T.

<Dielectric Layers>

The dielectric layers include a ceramic material. The dielectric layers include, as a main component, a perovskite oxide including barium (Ba) and titanium (Ti). Specifically, the dielectric layers include main crystal grains including the perovskite oxide. The main crystal grains include a barium titanate ($BaTiO_3$)-based compound. $BaTiO_3$ is a perovskite oxide represented by the general formula $ABO_3$. $BaTiO_3$ is a ferroelectric material that has a tetragonal crystalline structure at room temperature and exhibits high permittivity. Thus, the dielectric ceramic material including a $BaTiO_3$-based compound as a main component can have high permittivity and form a high-capacitance capacitor. As used herein, the term "main component" refers to a component the content of which is the highest in the ceramic material. The content of the main component may be about 50% by mass or more, about 60% by mass or more, about 70% by mass or more, about 80% by mass or more, or about 90% by mass or more.

The barium titanate ($BaTiO_3$)-based compound may be any type as long as it is a perovskite oxide including barium (Ba) and titanium (Ti) as main components. Specifically, the compound may be $BaTiO_3$ or partially substituted $BaTiO_3$ in which Ba and/or Ti is partially replaced with other elements. More specifically, barium (Ba) may be partially replaced with strontium (Sr) and/or calcium (Ca), and titanium (Ti) may be partially replaced with zirconium (Zr) and/or hafnium (Hf). The molar ratio of the A site element (e.g., Ba, Sr, Ca) to the B site element (e.g., Ti, Zr, Hf) in the $BaTiO_3$-based compound is not strictly limited to 1:1. The molar ratio of the A site element to the B site element may fluctuate as long as the compound maintains the perovskite crystal structure.

The dielectric layers may include an additive component other than the barium titanate ($BaTiO_3$)-based compound. The additive component may exist in any form and may be included in the main crystal grains, in the grain boundary phase, or at the triple junction. When the additive component is included in the main crystal grains, it may define the Ba site (A site), the Ti site (B site), or both sites in the $BaTiO_3$-based compound.

Examples of the additive component include rare earth elements (RE), manganese (Mn), magnesium (Mg), silicon (Si), aluminum (Al), and vanadium (V). The term "rare earth element" (RE) is a generic term for elements in the group consisting of scandium (Sc) with atomic number 21, yttrium (Y) with atomic number 39, and elements from lanthanum (La) with atomic number 57 to lutetium (Lu) with atomic number 71 in the periodic table. The rare earth element (RE) may be at least one selected from the group consisting of yttrium (Y), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). The additive component may exist in any form. The additive component may exist in or at any of the main component grains, the grain boundary, and the triple junction.

The dielectric layers preferably have a thickness of about 0.10 μm or more and about 1.00 μm or less, for example. The dielectric layers with a thickness of about 0.10 μm or more can prevent a decrease in insulating characteristics and produce improved reliability. The dielectric layers with a thickness of about 0.10 μm or more can also keep, at a low level, the content of the interface layers in the dielectric layers and prevent a decrease in capacitor capacitance. The dielectric layers with a thickness of about 1.00 μm or less are relatively thin and contribute to an improvement in capacitance. The number of the dielectric layers is preferably 100 or more and 900 or less, for example.

In the multilayer ceramic capacitor according to the present preferred embodiment, the dielectric layers have an inner portion that is in contact with the internal electrode layer and includes a non-perovskite interface layer including tin (Sn), barium (Ba), and titanium (Ti). In other words, an interface layer is provided as a portion of the dielectric layer at the interface between the dielectric layer and the internal electrode layer. The interface layer includes barium (Ba), titanium (Ti), and oxygen (O), which are components of the dielectric layer, and further includes tin (Sn). The interface layer has a crystal structure different from the perovskite structure. Specifically, the interface layer is a heterogenous phase having a composition and a crystal structure different from those of the dielectric layer.

The interface layer provided in such a manner allows the multilayer ceramic capacitor to have improved high-temperature load life and improved reliability. Although unclear in detail, the mechanism for that may be as explained below. It is empirically known that there is trade-off between the permittivity and the reliability of $BaTiO_3$-based dielectric materials. This means that the ferroelectric phase with high permittivity has a reliability lower than that of the low dielectric phase. The interface layer has a relatively low permittivity since it has a non-perovskite crystal structure. When a voltage is applied to the multilayer ceramic capacitor, the interface layer will bear some of the voltage. This makes it possible to reduce the voltage level applied across the non-interface layer region of the dielectric layer, which is a ferroelectric phase, so that the multilayer ceramic capacitor can have improved reliability. The reduction in the voltage level applied across the ferroelectric phase also makes it possible to improve the bias characteristics during DC application.

The presence of the interface layer may be determined by using high-angle annular dark field scanning transmission electron microscopy (HAADF-STEM) to observe the interface between the dielectric layer and the internal electrode layer in a cross-section of the multilayer ceramic capacitor. HAADF-STEM is a technique that includes scanning the sample with an electron probe focused on it, and using an annular detector to detect high-angle scattered electrons passing through the sample and to perform two-dimensional mapping. HAADF-STEM provides atomic resolution images and allows easy image interpretation due to no image contrast inversion. HAADF-STEM also features the ability to enable high-accuracy determination of atomic species.

The interface layer preferably has a thickness of about 0.4 nm or more and about 2.0 nm or less, for example. Such a thickness corresponds to a thickness of 1 to 5 atomic layers. The interface layer with a thickness of about 0.4 nm or more can sufficiently produce its effect and further increase the capacitor reliability. When the interface layer including a non-perovskite oxide, which is a low dielectric layer, has a thickness of about 2.0 nm or less, the capacitor will be prevented from having a low capacitance. The interface layer more preferably has a thickness of about 0.4 nm or more and about 1.2 nm or less, for example. In other words, the interface layer preferably has a thickness of one or more and three or less atomic layers.

The interface layer may be provided over the interface between the dielectric layer and the internal electrode layer or provided to cover a portion of the interface. When provided to cover a portion of the interface, the interface layer may exist at only one place or multiple places. To effectively improve the reliability, the interface layer preferably exists at as many places as possible.

The dielectric layers preferably further include a rare earth element (RE). The addition of a rare earth element makes it possible to improve properties such as high-temperature load life and temperature-dependent properties of permittivity. The main component $BaTiO_3$ may include a lot of oxygen vacancies produced in a firing step. The oxygen vacancies provide a path for electric charges to flow and tend to lower the insulation resistance. When a rare earth element is added to the dielectric layer, it tends to form a solid solution at the Ba or Ti site of the $BaTiO_3$-based compound. The solid solution of the rare-earth element can function as a donor or acceptor to hinder the migration of oxygen vacancies. This increases the insulation resistance and improves the high-temperature load life. The dielectric layer may include one or more rare earth elements. The rare earth element may be included only in the $BaTiO_3$-based compound as a main component and may be included at the grain boundary or the triple junction.

The rare earth element (RE) preferably includes dysprosium (Dy). In the periodic table, dysprosium (Dy) is located near the center in the lanthanoid family and has a middle ionic radius. Thus, dysprosium can form a solid solution at both of the Ba and Ti sites of the $BaTiO_3$-based compound, which is effective in improving reliability. The dielectric layer may include only dysprosium (Dy) as a rare earth element or may include dysprosium (Dy) and any other rare earth element.

The dielectric layer preferably includes an inner portion that is in contact with the internal electrode layer and has a segregated dysprosium phase (segregated Dy phase). The segregated Dy phase is produced when dysprosium (Dy) not forming a solid solution in the $BaTiO_3$-based compound as a main component is segregated at the interface in the firing step. The presence of the segregated Dy phase allows the multilayer ceramic capacitor to have further improved reliability.

<Internal Electrode Layers>

The internal electrode layers include an electrically-conductive metal. The electrically-conducive metal may be a known electrode material, such as nickel (Ni), copper (Cu), silver (Ag), palladium (Pd), or an alloy including any of them. The internal electrode layers may also include an additional component other than the electrically-conductive metal. The additional component may be a ceramic component defining and functioning as an additive. The ceramic component may be a $BaTiO_3$-based compound, which is the same as the component of the dielectric layer.

Preferably, the internal electrode layers include at least one metal selected from the group consisting of nickel (Ni), copper (Cu), silver (Ag), and palladium (Pd) and further include tin (Sn). As a non-limiting example, Sn oxide may be added to green sheets as precursors of the dielectric layers in the process of producing the multilayer ceramic capacitor according to the present preferred embodiment. Sn migrates from the green sheet to the internal electrode layer in the process of firing a stack of the green sheets. As a result, a Sn-including interface layer is formed, and Sn is diffused into the internal electrode layer. In the internal electrode layer, Sn forms an alloy, such as a Ni—Sn alloy, a Cu—Sn alloy, a Ag—Sn alloy, or a Pd—Sn alloy.

The internal electrode layers preferably have a thickness of about 0.3 μm or more and about 0.4 μm or less, for example. The internal electrode layer with a thickness of about 0.3 μm or more is less likely to suffer from failure, such as fragmentation. When the internal electrode layers have a thickness of about 0.4 μm or less, a significant decrease in the content of the dielectric layers in the capacitor can be prevented, so that a significant decrease in capacitance can be prevented.

<External Electrodes>

The external electrodes may have known features. For example, the external electrodes may have a multilayer structure including a base layer, a first plated layer, and a second plated layer, which are arranged in order from the end surface side of the multilayer ceramic capacitor. The base layer includes, for example, a metal, such as nickel (Ni) or copper (Cu). Besides the metal, the base layer may include ceramic particles as an additive. The first plated layer is, for example, a plated nickel (Ni) layer. The second plated layer is, for example, a plated tin (Sn) layer. An electrically-conductive resin layer may be provided between the base layer and the first plated layer. The electrically-conductive resin layer may include a resin and particles of an electrically-conductive metal, such as copper (Cu), silver (Ag), or nickel (Ni). The external electrodes may be in any form as long as they are electrically connected to the internal electrode layers to function as external input/output terminals.

(2) Method for Producing Multilayer Ceramic Capacitor

The multilayer ceramic capacitor according to the present preferred embodiment may be produced by any method capable of satisfying the requirements described above. However, the multilayer ceramic capacitor is preferably produced by the method described below. A preferred method for producing the multilayer ceramic capacitor includes the steps of: producing green sheets including at least barium (Ba), titanium (Ti), and tin (Sn) (green sheet producing step); applying an electrically-conductive paste to the surface of the green sheets to form an internal electrode pattern (internal electrode pattern forming step); stacking and pressure-bonding the green sheets to form a multilayer block (stacking step); cutting the resulting multilayer block into multilayer chips (cutting step); subjecting the resulting multilayer chips to binder removal and firing to give element bodies (firing step); and forming external electrodes on each resulting element body (external electrode forming step). Each step will be described in detail below.

<Green Sheet Producing Step>

The green sheet producing step includes producing green sheets including at least barium (Ba), titanium (Ti), and tin (Sn). The green sheet is a precursor of the dielectric layer of the capacitor, which includes the raw material for the main component of the dielectric layer, an additive component raw material, and an oxide of tin. The green sheet may be produced by any known method. The main component raw material and the additive component raw material may be mixed to form a dielectric raw material. A binder and a solvent may be added to the resulting dielectric raw material to form a slurry. The resulting slurry may be formed into green sheets. The oxide of Sn may be added to the dielectric raw material and/or the slurry.

The main component raw material may be a powder of a $BaTiO_3$-based compound having a perovskite structure ($ABO_3$). The $BaTiO_3$-based compound may be synthesized by a known method, such as a solid phase reaction method, a hydrothermal synthesis method, or an alkoxide method. The additive component raw material may be a known ceramic raw material, such as an oxide, carbonate, hydroxide, nitrate, organic acid salt, alkoxide, and/or chelate compound of the additive component (e.g., RE, Mn, Mg, Si, Al, V).

The raw materials may be mixed by a known method. For example, the main component raw material, the additive component raw material, and optionally tin (Sn) oxide are weighed and then mixed and ground with a grinding medium and pure water in a ball mill by a wet process. When a wet process is used for the mixing, the resulting mixture may be dried. The slurry may also be produced by a known method, which may include mixing the dielectric raw material with an organic binder and an organic solvent. The organic binder may be a known binder, such as a polyvinyl butyral-based binder. The organic solvent may be a known solvent, such as toluene or ethanol. If necessary, a plasticizer and any other additive may be added to the slurry. The green sheet may be formed by a known forming method, such as a doctor blade method or a lip method.

The production method according to the present preferred embodiment is characterized in that the green sheet includes an oxide of tin (Sn). In the subsequent firing step, the tin oxide-including green sheet will produce a tin-including interface layer and produce a Sn-including alloy in the internal electrode layer. The tin oxide may be added at any appropriate time. The tin oxide may be added together with the main component raw material and the additive component raw material in the process of producing the dielectric raw material, or may be added together with the dielectric raw material in the process of producing the slurry.

The green sheet preferably includes about 0.01 parts by mole or more and about 0.10 parts by mole or less of tin (Sn) based on 100 parts by mole of titanium (Ti), for example. When the content of tin (Sn) is about 0.01 parts by mole or more, the formation of the interface layer can be effectively promoted, so that the resulting multilayer ceramic capacitor can have further increased reliability. When the content of tin (Sn) is about 0.10 parts by mole or less, formation of an excessively thin interface layer can be prevented, so that a decrease in the capacitance of the multilayer ceramic capacitor can be prevented.

<Electrode Pattern Forming Step>

The electrode pattern forming step includes applying an electrically-conductive paste to the surface of the green sheets to form an internal electrode pattern. The internal electrode pattern is turned into the inner electrode layer by firing. The electrically-conductive paste may include an electrically-conductive metal, such as nickel (Ni), copper (Cu), silver (Ag), palladium (Pd), or an alloy including any of them. A ceramic component for defining and functioning as an additive may also be added to the electrically-conductive paste. Such a ceramic component may be the same as the main component raw material for the dielectric layer. The electrically-conductive paste may be applied by a known method, such as screen printing or gravure printing.

<Stacking Step>

The stacking step includes stacking and pressure-bonding the green sheets to form a multilayer block. Basically, the green sheets are internal electrode pattern-carrying green sheets. However, some of the green sheets may be internal electrode pattern-free green sheets. The stacking and pressure-bonding may be performed by a known method.

<Cutting Step>

The cutting step includes cutting the resulting multilayer block into multilayer chips. The cutting may be performed such that chips with a predetermined size will be obtained with at least part of the internal electrode pattern exposed at the end surface of each multilayer chip.

<Firing Step>

The firing step includes subjecting the resulting multilayer chips to binder removal and firing to give element bodies. The green sheet and the internal electrode pattern are co-sintered by the firing to give the dielectric layer and the internal electrode layer, respectively. The conditions for the binder removal may be determined depending on the type of the organic binder in the green sheet and the internal electrode pattern. The firing may be carried out at a temperature where the multilayer chip can be sufficiently densified. For example, the firing may be carried out by holding the temperature at about 1,200° C. or more and about 1,300° C. or less for a time period of 0 minutes or more and about 30 minutes or less, for example. The firing may be carried out in an atmosphere in which the $BaTiO_3$-based compound as a main component does not undergo reduction and the electrically-conductive metal is less likely to undergo oxidation. For example, the firing may be carried out in a $N_2$—$H_2$—$H_2O$ stream with an oxygen partial pressure of about $10^{-10}$ MPa to about $10^{-12}$ MPa. The firing may be followed by annealing.

During the firing step, tin (Sn) migrates from the inside of the green sheet to the inner electrode layer. As a result, a Sn-including interface layer is formed, and Sn is diffused into the internal electrode layer. In the internal electrode layer, Sn forms an alloy, such as a Ni—Sn alloy, a Cu—Sn alloy, a Ag—Sn alloy, or a Pd—Sn alloy.

<External Electrode Forming Step>

The external electrode forming step includes forming external electrodes on each resulting element body. The external electrodes may be formed by a known method. For example, the external electrode may be formed by a process that includes applying an electrically-conductive paste including a metal such as silver (Ag), copper (Cu), and/or nickel (Ni) to the end surface at which the extending internal electrodes of the element body are exposed, and baking the electrically-conductive paste. Alternatively, the external electrode may be formed by a process that includes applying an electrically-conductive paste to both end surfaces of the unfired multilayer chip, and then firing the multilayer chip. The resulting electrode may be used as a base layer, on which a film, such as a nickel (Ni) or tin (Sn) film may be formed by plating. The multilayer ceramic capacitor is produced in this manner.

EXAMPLES

Preferred embodiments of the present invention will be described in more detail with reference to examples and comparative examples. It will be understood, however, that the examples of preferred embodiments described and shown below are not intended to limit the present invention.

(1) Preparation of Multilayer Ceramic Capacitors

Examples 1 to 15

First, predetermined amounts of the main component raw materials for dielectric layers: a barium carbonate ($BaCO_3$) powder and a titanium oxide ($TiO_3$) powder were weighed. Subsequently, the weighed powders were mixed in a ball mill and then heat-treated under predetermined conditions to give a $BaTiO_3$-based compound powder.

Next, additive component raw materials were weighed including 0.75 parts by mole of dysprosium oxide ($Dy_2O_3$), 1 part by mole of magnesium oxide (MgO), 0.2 parts by mole of manganese oxide (MnO), and 1 part by mole of silicon oxide ($SiO_2$) based on 100 parts by mole of titanium (Ti) in the main component. For some samples, tin oxide ($SnO_2$) was further added as an additive component raw material. The amount of addition of the tin oxide ($SnO_2$) was adjusted as shown in Table 1 based on 100 parts by mole of titanium (Ti) in the main component. Subsequently, the resulting additive component raw material powder and water were added to the main component raw material powder and mixed in a ball mill for a certain period of time. The mixture was dried and then dry-pulverized to give a dielectric raw material powder.

A polyvinyl butyral-based binder and ethanol were added to the resulting dielectric raw material powder and mixed in a ball mill to form a slurry. The resulting slurry was formed into green sheets by a doctor blade method. The resulting green sheets were 0.6 μm to 1.2 μm in thickness.

Next, an electrically-conductive paste was applied in a predetermined pattern to the surface of the resulting green sheets to form an internal electrode pattern. The electrically-conductive paste was prepared by adding a polyvinyl butyral-based binder and ethanol to a nickel (Ni) powder and wet-mixing them in a ball mill.

A multilayer block was obtained by stacking the internal electrode pattern-carrying green sheets in such a way that the internal electrode pattern extension sides of the green sheets were exposed alternately on opposite sides. The resulting multilayer block was then cut into pieces so that multilayer chips were obtained.

The resulting multilayer chips were heated in a nitrogen ($N_2$) atmosphere at 350° C. so that the binder was burnt out. Subsequently, the multilayer chips resulting from the burning out of the binder was subjected to firing in a reducing atmosphere at 1,200° C. for 20 minutes to make the firing timing of the internal electrode pattern different from that of the green sheet, which allows a heterogeneous phase to be formed. In the firing, a $H_2$—$N_2$—$H_2O$ gas with an oxygen partial pressure of $10^{-10}$ to $10^{-12}$ MPa was used for the atmosphere. The temperature was raised at a rate of 50° C./minute to 100° C./minute. After the firing, the resulting element bodies were annealed at 1,050° C. for 30 minutes in an atmosphere with an oxygen partial pressure of $10^{-12}$ to $10^{-15}$ MPa.

A silver (Ag) paste including $B_2O_3$—$SiO_2$—BaO based glass frit was applied to both end surfaces of each of the annealed element bodies and then baked at 600° C. in a nitrogen ($N_2$) atmosphere to form external electrodes each electrically connected to the internal electrode layers.

Multilayer ceramic capacitors were produced in the above-described way. Each of the resulting multilayer ceramic capacitors had an outer shape of 1.0 mm in length, 0.5 mm in width, and 0.5 mm in thickness. The multilayer ceramic capacitor had 490 dielectric layers each sandwiched between the internal electrode layers and each having a thickness of 0.33 to 0.60 μm. The internal electrode layers had a thickness of 0.45 μm.

(2) Evaluation

The multilayer ceramic capacitors obtained in Examples 1 to 15 were evaluated for characteristics as shown below.

<Dielectric Characteristics>

The resulting multilayer ceramic capacitors were evaluated by measuring capacitance (Cap.) under the conditions of 1 kHz and an AC voltage of 1 V using an automatic bridge meter. Ten samples were evaluated, and the capacitance was determined as the average of the measured values.

The multilayer ceramic capacitors were also subjected to a highly accelerated life test (HALT), in which the mean time to failure (MTTF) was determined. In the highly accelerated life test, a high-temperature load was applied to the multilayer ceramic capacitors under the conditions of 150° C. and 6.3 V. Failure time points were recorded when the insulation resistance reached 10 kΩ or less, from which the mean time to failure (MTTF) was calculated. Ten samples were evaluated, and the average of the measurements was calculated.

<HAADF-STEM Observation>

A high-angle annular dark field scanning transmission electron microscope (HAADF-STEM) was used to observe the interface between the dielectric layer and the internal electrode layer of each multilayer ceramic capacitor. For the observation, samples were prepared by using focused ion beam (FIB) technique for thin film processing. The observation was performed using scanning transmission electron microscopy (STEM) (atomic resolution analysis electron microscope: JEM-ARM200F manufactured by JEOL Ltd.) and scanning transmission electron microscopy-energy dispersive X-ray spectroscopy (STEM-EDX) (atomic resolution analysis electron microscope: JEM-ARM200F Dual-X manufactured by JEOL Ltd., EDX: JED-2300 manufactured by JEOL Ltd., system: NORAN™ System 7). An acceleration voltage of 200 kV and a beam diameter of about 0.2 nmcp were used as basic conditions and modified as appropriate. The orientation of the dielectric element (parent phase: dielectric layer) in the multilayer ceramic capacitor was adjusted to the (100) direction. Then, the interface between a dielectric grain and the internal electrode (internal electrode layer) was observed. Subsequently, the orientation was adjusted again to the (100) direction with respect to another dielectric grain. Then, the interface between the dielectric grain and the internal electrode (internal electrode layer) was observed. This procedure was repeated five times for different dielectric grains, in which the number of interface layers including a non-perovskite complex oxide and the number of segregated dysprosium phases (segregated Dy phases) were determined.

(3) Evaluation Results

Table 1 summarizes the results of the evaluation of the capacitor samples of Examples 1 to 15.

Any interface layer including a non-perovskite oxide with a low dielectric phase was not observed in the tin (Sn)-free samples (Examples 1, 6, and 11). Any segregated Dy phase was also not observed in those samples. Thus, their mean time to failure (MTTF) was short.

In contrast, interface layers including a non-perovskite complex oxide were observed in the tin (Sn)-including samples (Examples 2 to 5, 7 to 10, and 12 to 15). As the tin (Sn) content increased, the number of the interface layers increased, and the mean time to failure (MTTF) increased accordingly. In particular, the high tin (Sn) content samples (Examples 3 to 5, 8 to 10, and 13 to 15) had interface layers observed together with segregated Dy phases and also had a longer mean time to failure (MTTF). However, the capacitance decreased with increasing tin (Sn) content. Thus, it has been discovered that the tin (Sn) content should preferably be set within an appropriate range so that good life characteristics can be achieved while high capacitance is maintained.

Figure 4A:
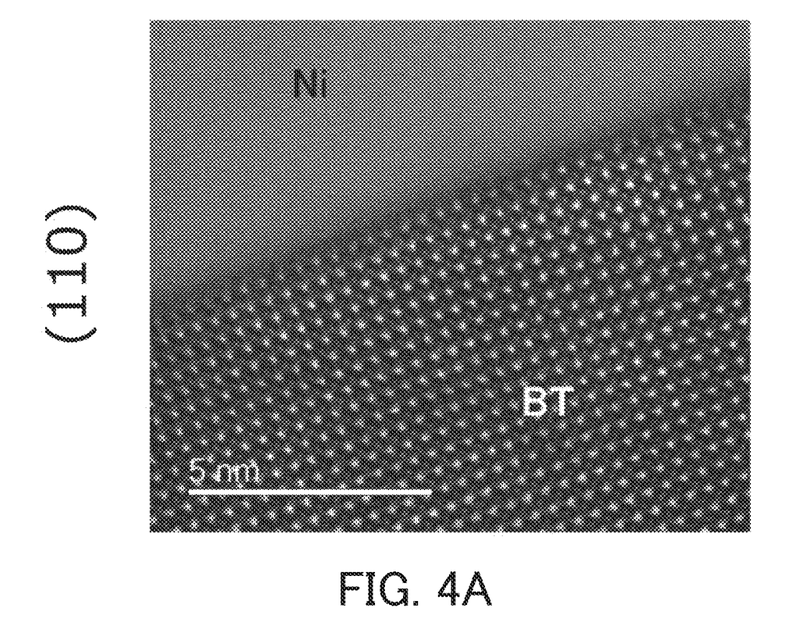
FIGS. 4A and 4B are high-angle annular dark field scanning transmission electron microscopy (HAADF-STEM) images showing an interface between a dielectric layer and an internal electrode layer.
Figure 4B:
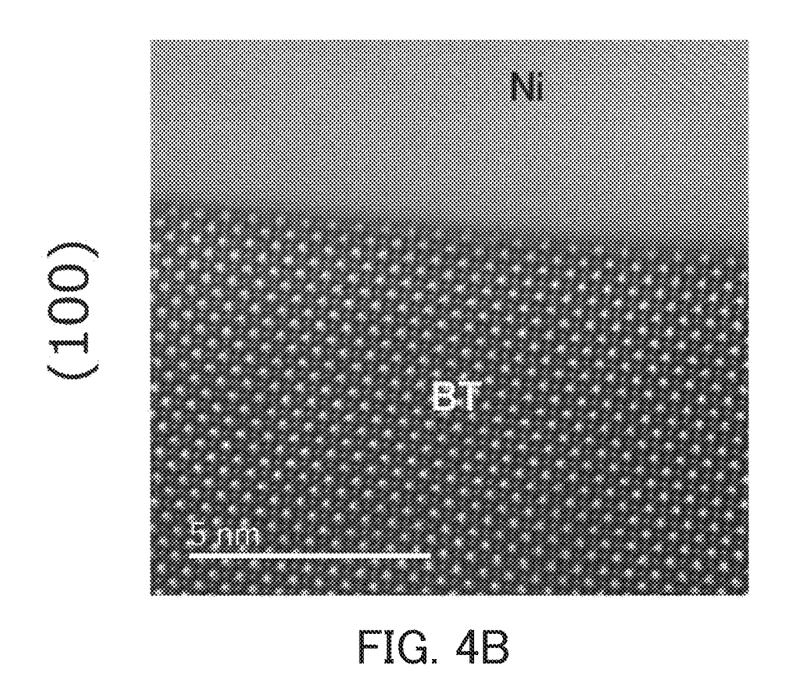
Figure 5A:
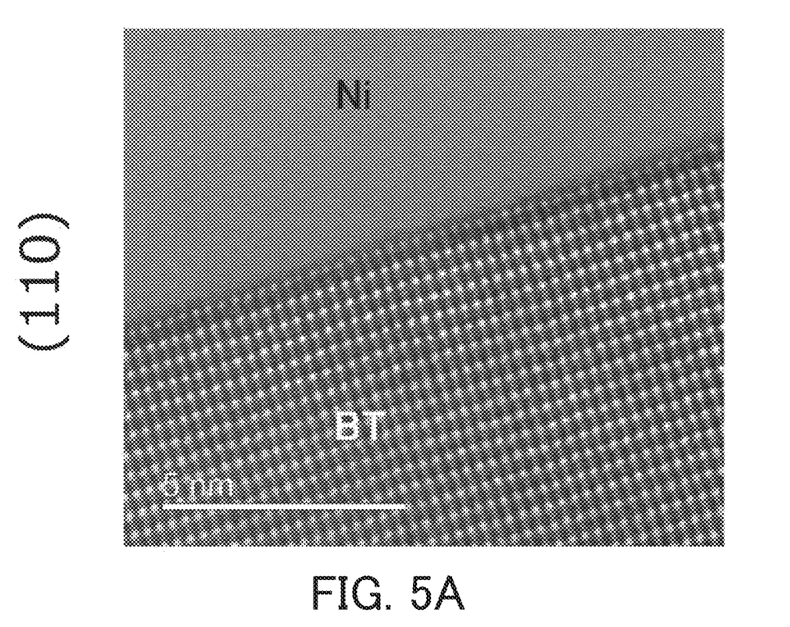
FIGS. 5A and 5B are HAADF-STEM images showing an interface between a dielectric layer and an internal electrode layer.
Figure 5B:
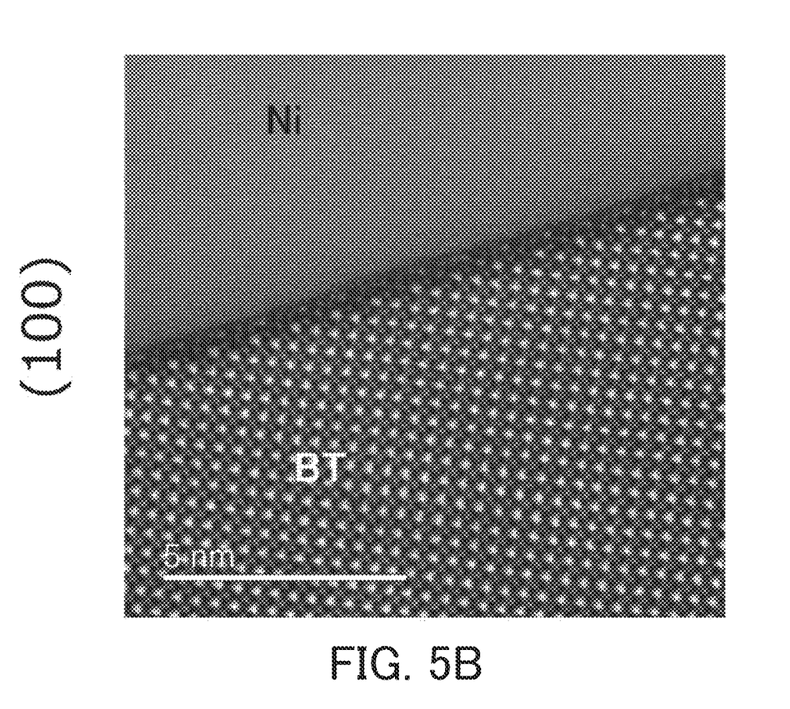
Figure 6:
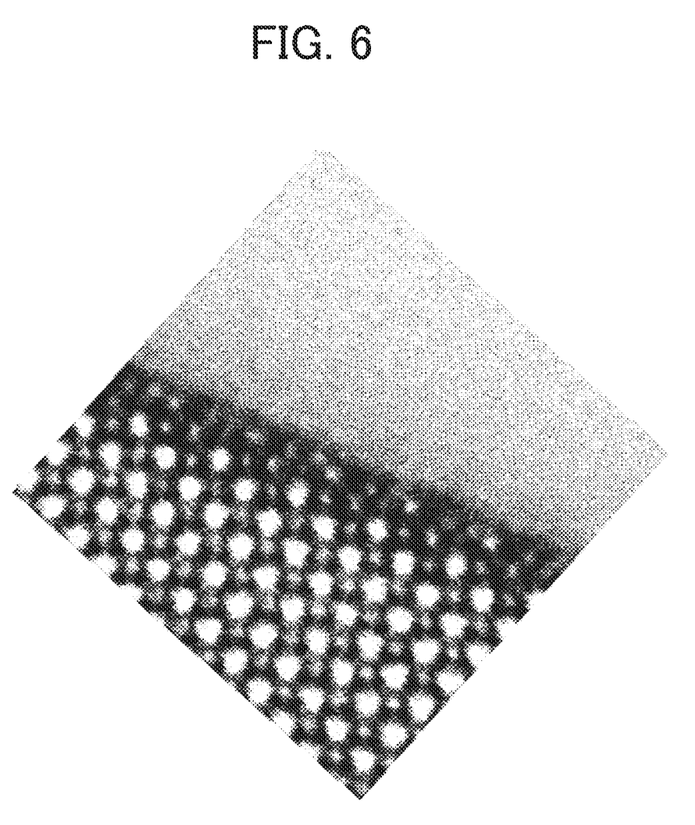
FIG. 6 is an HAADF-STEM image showing an interface between a dielectric layer and an internal electrode layer.

FIGS. 4A and 4B show HAADF-STEM images of the multilayer ceramic capacitor obtained in Example 1. FIGS. 5A, 5B, and 6 show HAADF-STEM images of the multilayer ceramic capacitor obtained in Example 3. They all show the microscopic structure at and near the interface between the dielectric layer and the internal electrode layer in the multilayer ceramic capacitor. FIGS. 4A and 5A show images observed such that the perovskite compound crystals in the dielectric layer are oriented in the (110) direction. FIGS. 4B and 5B show images observed such that the crystals are oriented in the (100) direction. FIG. 6 shows an enlarged image of FIGS. 5A and 5B.

Any interface layer was not clearly observed in the tin (Sn)-free sample of Example 1. In contrast, in the tin (Sn)-including sample of Example 3, an interface layer was clearly observed in an inner portion of the dielectric layer, which was in contact with the inner electrode layer. The interface layer had a thickness of about two atomic layers. The interface layer was also found to include a non-perovskite oxide including tin (Sn), barium (Ba), and titanium (Ti).

TABLE 1

Characteristics of multilayer ceramic capacitor

| | Sn content (mol) | Number of Interface layers | Segregated Dy phase | Capacitance (μF) | Mean time to failure (hr) | Dielectric layer thickness (μm) | Area of overlap (mm²) | Number of stacked layers |
|---|---|---|---|---|---|---|---|---|
| Example1* | 0.00 | 0/5 | Absent | 12.1 | 9.2 | 0.60 | 0.5 | 490 |
| Example2 | 0.10 | 1/5 | Absent | 12.0 | 13.7 | 0.60 | 0.5 | 490 |
| Example3 | 0.15 | 3/5 | Present | 11.5 | 46.3 | 0.60 | 0.5 | 490 |

TABLE 1-continued

Characteristics of multilayer ceramic capacitor

| | Sn content (mol) | Number of Interface layers | Segregated Dy phase | Capacitance (μF) | Mean time to failure (hr) | Dielectric layer thickness (μm) | Area of overlap (mm$^2$) | Number of stacked layers |
|---|---|---|---|---|---|---|---|---|
| Example4 | 0.25 | 4/5 | Present | 9.8 | 127.0 | 0.60 | 0.5 | 490 |
| Example5 | 0.35 | 4/5 | Present | 7.3 | 220.0 | 0.60 | 0.5 | 490 |
| Example6* | 0.00 | 0/5 | Absent | 15.2 | 8.5 | 0.44 | 0.5 | 490 |
| Example7 | 0.10 | 0/5 | Absent | 15.0 | 11.6 | 0.44 | 0.5 | 490 |
| Example8 | 0.15 | 3/5 | Present | 13.9 | 35.3 | 0.44 | 0.5 | 490 |
| Example9 | 0.25 | 4/5 | Present | 11.8 | 90.4 | 0.44 | 0.5 | 490 |
| Example10 | 0.35 | 4/5 | Present | 8.4 | 132.8 | 0.44 | 0.5 | 490 |
| Example11* | 0.00 | 0/5 | Absent | 18.2 | 2.8 | 0.33 | 0.5 | 490 |
| Example12 | 0.10 | 1/5 | Absent | 17.4 | 3.2 | 0.33 | 0.5 | 490 |
| Example13 | 0.15 | 3/5 | Present | 16.3 | 8.7 | 0.33 | 0.5 | 490 |
| Example14 | 0.25 | 4/5 | Present | 13.5 | 16.3 | 0.33 | 0.5 | 490 |
| Example15 | 0.35 | 5/5 | Present | 9.5 | 23.5 | 0.33 | 0.5 | 490 |

Note 1:
"*" indicates comparative examples.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   first and second main surfaces opposite to each other in a thickness direction;
   first and second side surfaces opposite to each other in a width direction;
   first and second end surfaces opposite to each other in a longitudinal direction;
   an element body including a plurality of dielectric layers and a plurality of internal electrode layers stacked in the thickness direction; and
   a pair of external electrodes on the first and second end surfaces and electrically connected to the plurality of internal electrode layers;
   the dielectric layers including, as a main component, a perovskite oxide including barium (Ba) and titanium (Ti);
   the dielectric layers including an inner portion that is in contact with the internal electrode layer and includes an interface layer including a non-perovskite oxide including tin (Sn), barium (Ba), and titanium (Ti).

2. The multilayer ceramic capacitor according to claim 1, wherein the dielectric layers further include a rare earth element (RE) including dysprosium (Dy).

3. The multilayer ceramic capacitor according to claim 1, wherein the dielectric layers include an inner portion that is in contact with the internal electrode layer and includes a segregated dysprosium (Dy) phase.

4. The multilayer ceramic capacitor according to claim 1, wherein the interface layer has a thickness of about 0.40 nm or more and about 2.00 nm or less.

5. The multilayer ceramic capacitor according to claim 1, wherein the dielectric layers have a thickness of about 0.10 μm or more and about 1.00 μm or less.

6. The multilayer ceramic capacitor according to claim 1, wherein the internal electrode layers have a thickness of about 0.3 μm or more and about 0.4 μm or less.

7. The multilayer ceramic capacitor according to claim 1, wherein the internal electrode layers include at least one metal selected from the group consisting of nickel (Ni), copper (Cu), silver (Ag), and palladium (Pd) and further include tin (Sn).

8. The multilayer ceramic capacitor according to claim 1, wherein the internal electrode layers include a tin (Sn) alloy.

9. The multilayer ceramic capacitor according to claim 1, wherein the multilayer ceramic capacitor has a substantially rectangular parallelepiped shape.

10. The multilayer ceramic capacitor according to claim 1, wherein the multilayer ceramic capacitor includes rounded corners or rounded ridges.

11. The multilayer ceramic capacitor according to claim 1, wherein the multilayer ceramic capacitor has a size of about 0.2 mm or more and about 1.2 mm or less in the longitudinal direction, a size of about 0.1 mm or more and about 0.7 mm or less in the width direction, and a size of about 0.1 mm or more and about 0.7 mm or less in the stacking direction.

12. The multilayer ceramic capacitor according to claim 1, wherein the dielectric layers include main crystal grains including the perovskite oxide.

13. The multilayer ceramic capacitor according to claim 1, wherein the dielectric layers include main crystal grains including a barium titanate (BaTiO$_3$)-based compound.

14. The multilayer ceramic capacitor according to claim 1, wherein the dielectric layers include an additive component including rare earth elements (RE), manganese (Mn), magnesium (Mg), silicon (Si), aluminum (Al), or vanadium (V).

15. The multilayer ceramic capacitor according to claim 1, wherein the interface layer has a crystal structure different from a structure of the perovskite oxide.

16. The multilayer ceramic capacitor according to claim 1, wherein the interface layer is a heterogenous phase with a composition and a crystal structure different from those of the dielectric layers.

17. The multilayer ceramic capacitor according to claim 1, wherein the interface layer has a thickness of 1 to 5 atomic layers.

18. The multilayer ceramic capacitor according to claim 1, wherein the interface layer is provided over interfaces between the dielectric layers and the internal electrode layers.

19. The multilayer ceramic capacitor according to claim 1, wherein the interface layer covers a portion of interfaces between the dielectric layers and the internal electrode layers.

20. The multilayer ceramic capacitor according to claim 1, wherein the external electrodes include a multilayer structure including a base layer, a first plated layer, and a second plated layer.

* * * * *